(12) United States Patent
Yamamoto et al.

(10) Patent No.: US 11,970,827 B2
(45) Date of Patent: Apr. 30, 2024

(54) MAGNETIC MARKER

(71) Applicant: Aichi Steel Corporation, Tokai (JP)

(72) Inventors: Michiharu Yamamoto, Tokai (JP); Masaaki Nakada, Tokai (JP)

(73) Assignee: AICHI STEEL CORPORATION, Tokai (JP)

(*) Notice: Subject to any disclaimer, the term of this patent is extended or adjusted under 35 U.S.C. 154(b) by 45 days.

(21) Appl. No.: 17/777,051

(22) PCT Filed: Nov. 24, 2020

(86) PCT No.: PCT/JP2020/043687
§ 371 (c)(1),
(2) Date: May 16, 2022

(87) PCT Pub. No.: WO2021/106878
PCT Pub. Date: Jun. 3, 2021

(65) Prior Publication Data
US 2023/0033183 A1   Feb. 2, 2023

(30) Foreign Application Priority Data

Nov. 26, 2019 (JP) .................................. 2019-213746

(51) Int. Cl.
*E01F 9/30* (2016.01)
*B32B 3/26* (2006.01)
(Continued)

(52) U.S. Cl.
CPC ................ *E01F 9/30* (2016.02); *B32B 3/266* (2013.01); *B32B 7/06* (2013.01); *B32B 7/12* (2013.01);
(Continued)

(58) Field of Classification Search
CPC ............. E01F 9/30; E01F 9/512; B32B 3/266
(Continued)

(56) References Cited

U.S. PATENT DOCUMENTS 3,609,678 A * 9/1971 Fayling ................ G05D 1/0261
340/905
6,518,884 B1 * 2/2003 Tanji ..................... G08G 1/042
340/572.1
(Continued)

FOREIGN PATENT DOCUMENTS

JP    2003-27432 A   1/2003
JP    2005-2691 A    1/2005
(Continued)

OTHER PUBLICATIONS

International Search Report and Written Opinion dated Dec. 28, 2020, received for PCT Application PCT/JP2020/043687, Filed on Nov. 24, 2020, 9 pages including English Translation.

*Primary Examiner* — Allyson N Trail
(74) *Attorney, Agent, or Firm* — XSENSUS LLP

(57) ABSTRACT

A sheet-shaped magnetic marker (1) to be laid on a road surface so as to be able to be detected by a magnetic sensor attached to a vehicle to achieve assist for driving operation of the vehicle by a driver or control on a vehicle side to achieve automatic driving independently from operation of the driver is divided into a plurality of regions in a matrix shape by a cut line (1C) cutting a magnet sheet (11) and a nonskid layer (181), with an adhesive layer being left. Thus, if peeling partially occurs, a region including the peeled part can be isolated, and expansion of peeling can be prevented.

21 Claims, 17 Drawing Sheets

(51) Int. Cl.

| | | |
|---|---|---|
| *B32B 7/06* | (2019.01) | |
| *B32B 7/12* | (2006.01) | |
| *B32B 27/08* | (2006.01) | |
| *B32B 27/18* | (2006.01) | |
| *B32B 27/36* | (2006.01) | |
| *B60W 60/00* | (2020.01) | |
| *E01F 9/512* | (2016.01) | |
| *G06K 19/06* | (2006.01) | |
| *G06K 19/07* | (2006.01) | |
| *G08G 1/042* | (2006.01) | |

(52) U.S. Cl.
CPC .............. *B32B 27/08* (2013.01); *B32B 27/18* (2013.01); *B32B 27/36* (2013.01); *E01F 9/512* (2016.02); *G06K 19/06196* (2013.01); *G06K 19/0723* (2013.01); *G08G 1/042* (2013.01); *B32B 2264/102* (2013.01); *B32B 2307/208* (2013.01); *B32B 2307/744* (2013.01); *B32B 2307/748* (2013.01); *B32B 2405/00* (2013.01); *B60W 60/001* (2020.02); *B60W 2420/50* (2013.01); *B60W 2554/20* (2020.02)

(58) Field of Classification Search
USPC .......................................................... 235/492

See application file for complete search history.

(56) References Cited

U.S. PATENT DOCUMENTS

| | | | |
|---|---|---|---|
| 9,278,691 B1* | 3/2016 | Zsombory | G08G 1/167 |
| 11,358,445 B1* | 6/2022 | Shahoian | B60J 5/0479 |
| 11,604,476 B1* | 3/2023 | Leefer | G05D 1/0223 |
| 2003/0123930 A1 | 7/2003 | Jacobs et al. | |
| 2009/0123696 A1 | 5/2009 | Takagi et al. | |
| 2010/0145575 A1* | 6/2010 | Switkes | B62D 15/025 |
| | | | 701/41 |
| 2011/0264320 A1* | 10/2011 | Arnaud | G05D 1/0263 |
| | | | 701/23 |
| 2012/0035844 A1* | 2/2012 | Ono | G05D 1/0261 |
| | | | 427/550 |
| 2016/0132705 A1* | 5/2016 | Kovarik | G06K 7/10376 |
| | | | 340/10.3 |
| 2019/0079530 A1* | 3/2019 | Steder | G05D 1/0088 |
| 2021/0010214 A1* | 1/2021 | Bell | C09D 5/23 |
| 2021/0089858 A1 | 3/2021 | Yamamoto et al. | |
| 2022/0163616 A1* | 5/2022 | Rappaport | G01S 5/0218 |
| 2022/0212555 A1* | 7/2022 | Zhang | H02J 7/0063 |
| 2022/0306099 A1* | 9/2022 | Kleickmann | B60W 30/146 |
| 2023/0027357 A1* | 1/2023 | Satou | B60W 60/00186 |

FOREIGN PATENT DOCUMENTS

| | | |
|---|---|---|
| JP | 2005-202478 A | 7/2005 |
| JP | 2009-113459 A | 5/2009 |
| JP | 2017-139402 A | 8/2017 |
| KR | 10-2004-0071280 A | 8/2004 |
| WO | 2019/124196 A1 | 6/2019 |

* cited by examiner

MAGNETIC MARKER

CROSS-REFERENCE TO RELATED APPLICATIONS

The present application is based on PCT filing PCT/JP2020/043687, filed Nov. 24, 2020, which claims priority to JP 2019-213746, filed Nov. 26, 2019, the entire contents of each are incorporated herein by reference.

TECHNICAL FIELD

The present invention relates to a magnetic marker laid on a road to assist vehicle driving.

BACKGROUND ART

Conventionally, a vehicular magnetic marker detection systems using magnetic markers laid on a road has been known (for example, refer to Patent Literature 1). By taking vehicles having magnetic sensors attached thereto as targets, this magnetic marker detection system has an object of providing various driving assists such as automatic steering control and lane departure warning using magnetic markers laid along a lane.

As a magnetic marker, for example, a sheet-shaped magnetic marker has been suggested (for example, refer to Patent Literature 2). For example, the sheet-shaped magnetic marker can be affixed to a road surface. Since affixing the magnetic marker to the road surface without providing an accommodation hole or the like is low-cost installation, cost required to lay the magnetic markers can be reduced.

CITATION LIST

Patent Literature

Patent Literature 1: Japanese Unexamined Patent Application Publication No. 2005-202478
Patent Literature 2: Japanese Unexamined Patent Application Publication No. 2017-139402

SUMMARY OF INVENTION

Technical Problem

However, if the magnetic marker affixed to the road surface is used over a long period of time, a possibility occurs that the magnetic marker is peeled off from the road surface.

The present invention was made in view of the above-described conventional problem, and is to provide a sheet-shaped magnetic marker capable of suppressing the influence of peeling to a minimum.

Solution to Problem

The present invention resides in a sheet-shaped magnetic marker to be laid on a road surface so as to be able to be detected by a magnetic sensor attached to a vehicle to achieve assist for driving operation of the vehicle by a driver or control on a vehicle side to achieve automatic driving independently from operation of the driver,
the magnetic marker is divided into at least two regions by a continuous or intermittent cut line.

Advantageous Effects of Invention

The magnetic marker of the present invention is divided into at least two regions by a cut line. Thus, if peeling of any of the regions occurs, that region can be isolated by the cut line. If the peeled region can be isolated in this manner, it is possible to suppress a possibility of a spread of peeling to another region. The magnetic marker of the present invention has an excellent feature in which the possibility of a spread of peeling immediately to all regions is low and the influence of peeling can be suppressed to a minimum.

DESCRIPTION OF EMBODIMENT

As the cut line of the magnetic marker of the present invention, a cut line penetrating through the sheet-shaped magnetic marker in a thickness direction may be adopted, or a bottom-closed cut line not penetrating in the thickness direction may be adopted. For example, in the case of a penetrating cut line, as perforations, it is preferable to intermittently provide a range of penetrating in the thickness direction. If the cut line is in perforated form, the magnetic marker is not isolated into a plurality of regions even if the cut line penetrates in the thickness direction.

Also, for example, in the case of a magnetic marker in a multilayer structure including an adhesive layer made of an adhesive material with respect to the road surface, a magnetic layer made of a magnetic material, a nonskid layer containing an aggregate such as sand, with any one layer being left, a cut line penetrating through the other layers maybe provided. The cut line in this case may also be a intermittent cut line such as perforations, or a continuous cut line.

EMBODIMENTS

First Embodiments

The present embodiment is an example of sheet-shaped magnetic marker 1 laid on a road surface so as to be able to be detected by a magnetic sensor attached to a vehicle. This magnetic marker 1 is used to achieve assist to driving operation of the vehicle by a driver or control on a vehicle side to achieve automatic driving independently from the operation of the driver. Details of this are described with reference to FIG. 1 to FIG. 17.

Figure 1:
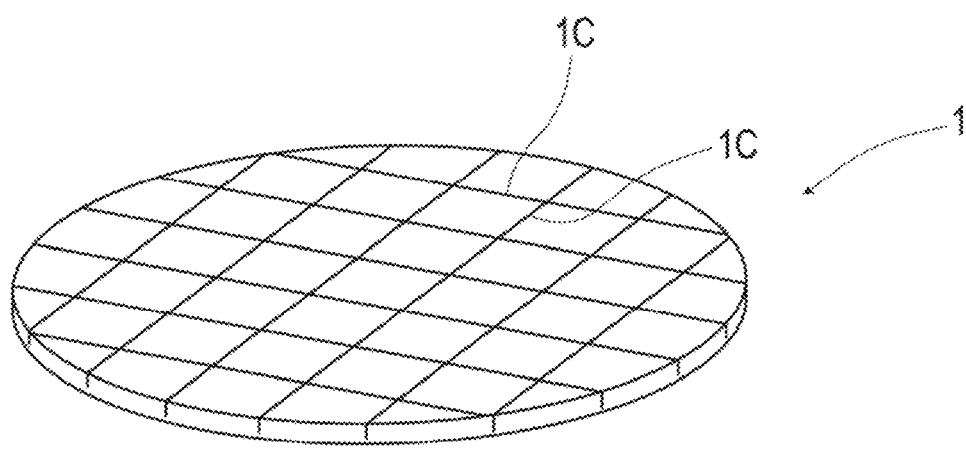
FIG. 1 is a perspective view of a magnetic marker.

Magnetic marker 1 exemplarily depicted in FIG. 1 is a road marker having a flat circular shape with a diameter of 100 mm and can be adhesive bonded, or the like to the road surface. A surface of magnetic marker 1 is provided with cut lines 10 forming a lattice shape. With these cut lines 1C, when peeling of a bonding surface of magnetic marker 1 to the road surface occurs, the peeled region is isolated to helping prevention of expansion of peeling.

Figure 2:
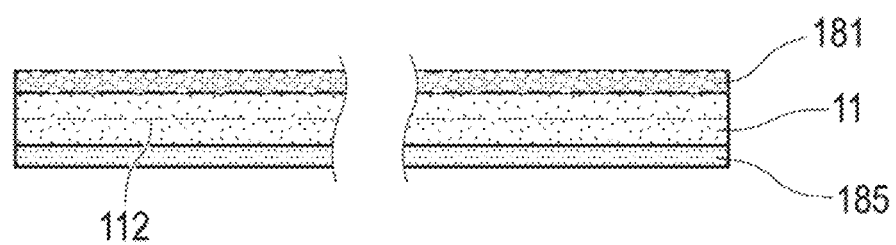
FIG. 2 is a diagram depicting a cross-sectional structure of the magnetic marker.

Magnetic marker 1 is, as depicted in FIG. 2, a marker in which a layer containing a pavement material is provided on each of both surfaces of flat magnet sheet 11 having a diameter of 100 mm and a thickness of 2 mm. The layer on a grounding side when magnetic marker 1 is laid is adhesive layer 185 using asphalt, which is a pavement material, as an adhesive material. The layer on a front surface side oriented to an upward at the time of laying is nonskid layer 181 with aggregate mixed into asphalt, which is a pavement material. The thickness of adhesive layer 185 is on the order of 1 mm. The thickness of nonskid layer 181 is on the order of 1 mm.

Nonskid layer 181 has a non-slip function of reducing a possibility of tire slipping and also a function as a protective layer to protect magnet sheet 11. Nonskid layer 181 maybe a layer of a non-slip tape, which is an adhesive tape having a non-slip function. Also, in place of nonskid layer 181, a protective layer without a non-slip function may be adopted. Examples of this protective layer include a PET (PolyEthylene Terephthalate) film and so forth. Also, release paper maybe affixed to adhesive layer 185. At the time of installation, the release paper can be peeled off for lamination to the road surface. By adopting the release paper, it is possible to reduce the possibility of a decrease in adhesive force of the adhesive layer 181 during storage, during transportation, during installation work, and so forth.

Figure 3:
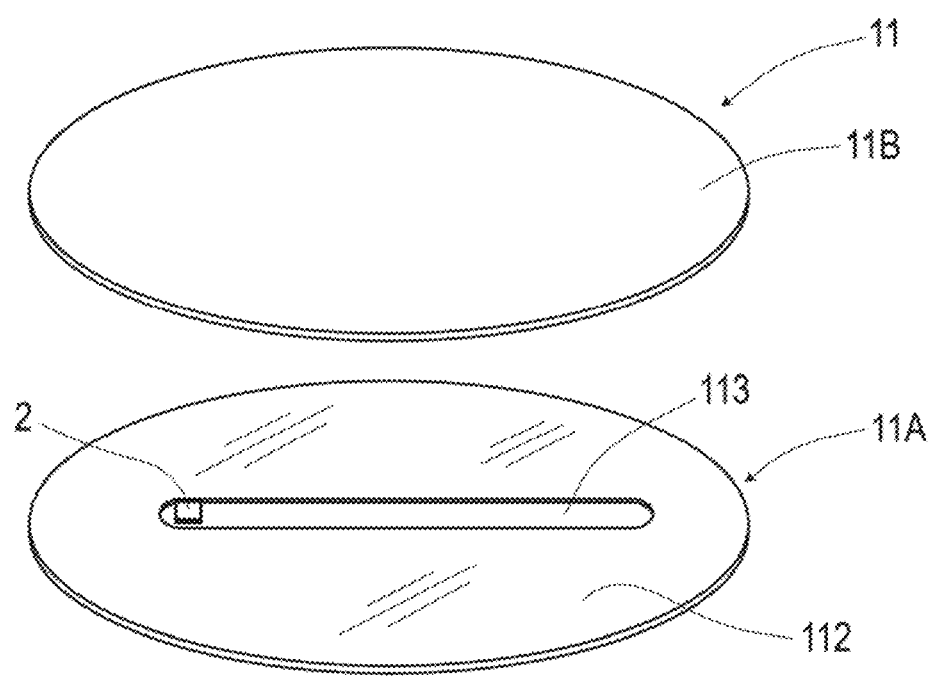
FIG. 3 is a diagram depicting the structure of a magnet sheet.

Magnet sheet 11 is formed by laminating sheets 11A and 11B having a diameter of 100 mm and a thickness of 1 mm together (refer to FIG. 3). In detail, an adhesive layer made of an adhesive material or the like is formed between sheet 11A and sheet 11B. Sheets 11A and 11B are one example of an intermediate sheet, which is an intermediate workpiece. Sheets 11A and 11B are obtained by forming an isotropic ferrite rubber magnet, with magnetic powder of iron oxide as a magnetic material dispersed in a high polymer material (non-electroconductive material) as abase material, into a sheet shape. As each having magnetic powder dispersed in a non-electroconductive high polymer material, sheets 11A and 11B have an electrical characteristics of low electrical conductivity. Also, sheets 11A and 11B have a magnetic characteristic of a maximum energy product (BHmax)=6.4 kJ/m3.

Here, magnetic characteristics of magnet sheet 11 as a magnetism generation source are briefly described. Magnet sheet 11 has a magnetic flux density Gs of the surface of 45 mT (milliteslas). For example, magnet sheets for use as being affixed to a whiteboard in office or the like, the door of a refrigerator at home, or the like, magnet sheets such as a beginner drivers' mark affixed to a vehicle body, and so forth have a magnetic flux density of the surface on the order of 20 milliteslas to 40 milliteslas. According to a comparison with these magnet sheets, the magnetic force generated from magnetic marker 1 of the present embodiment can be intuitively grasped as being a very weak magnetic force to the extent of not being capable of functioning as a general magnet which attracts a metallic substance.

As an attachment height of the magnetic sensor on the vehicle side, a height is assumed in a range on the order of 100 mm to 250 mm with reference to the road surface. According to magnetic field analysis simulations, actual measurement tests, and so forth, the magnitude of magnetism magnetic marker 1 acts with onto the highest position of 250 mm is equal to or larger than 40 μT (microteslas). The magnetism on the order of 40 μT can be detected with high reliability by a magnetic sensor with high sensitivity such as, for example, an MI sensor. Note that the MI sensor is a magnetic sensor using the MI (Magneto Impedance) effect in which the impedance of a magneto-sensitive body such as an amorphous wire sensitively changes in response to an external magnetic field.

Sheet 11A configuring magnet sheet 11 is a sheet on the grounding side, and sheet 11B is a sheet on the front surface side. In magnet sheet 11, RFID tag (RadioFrequency IDentification, wireless tag) 2 for providing information via wireless communication to the vehicle side is disposed so as to be interposed between the two sheets 11A and 11B.

On the surface of sheet 11A, RFID tag 2 is affixed and electroconductive layer 112 not electrically continuous to this RFID tag 2 is formed. Electroconductive layer 112 of the present embodiment is a silver paste layer formed by applying a silver paste as electroconductive ink (one example of an electroconductive material). As the electroconductive ink, a graphite paste, a silver chloride paste, a copper paste, a nickel paste, or the like can be used, in addition to the silver paste. Furthermore, a thin electroconductive layer made of a metal material by sputtering, vapor deposition, or the like may be formed.

Figure 4:
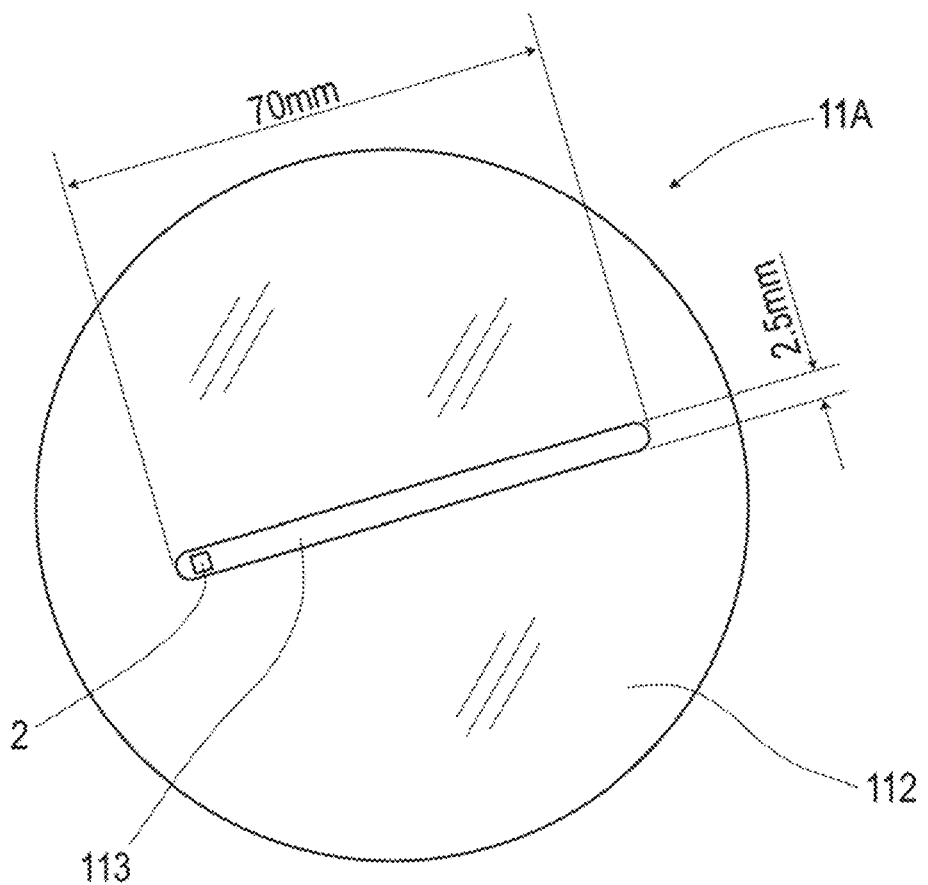
FIG. 4 is a front view of a sheet (grounding side) configuring the magnet sheet.
Figure 5:
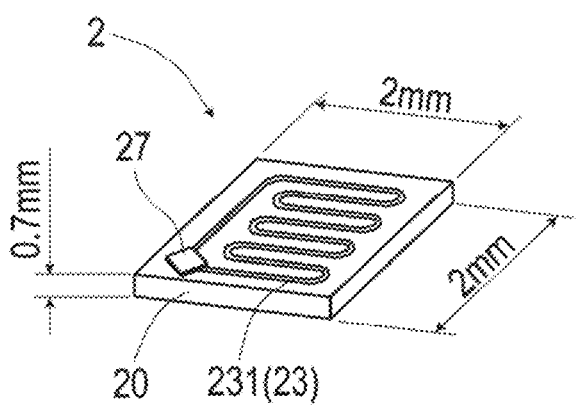
FIG. 5 is a perspective view of a wireless tag.

Electroconductive layer 112 is provided over the entire surface of sheet 11A, with slit window 113 being left (refer to FIG. 4). Slit window 113 is a gap having a width of 2.5 mm and a length of 70 mm. This slit window 113 is formed along a radial direction of circular-shaped sheet 11A. Note that the length of slit window 113 may be 60 mm. The length of slit window 113 is preferably on the order of 60 mm to 70 mm. RFID tag 2 is arranged inside slit window 113 so as not to electrically make contact with electroconductive layer 112. In the present embodiment, RFID tag 2 is positioned near an end portion of slit window 113. Electroconductive layer 112 functions as a booster antenna (one example of a secondary antenna) which amplifies radio waves transmitted and received by RFID tag 2.

RFID tag 2 (FIG. 5) is an electronic component having IC (Integrated Circuit) chip 27 implemented on the surface of tag sheet 20 as a sheet-shaped member. RFID tag 2 is configured to operate by power externally supplied via wireless transfer to wirelessly transmit information stored in IC chip 27. RFID tag 2 exhibits a square sheet shape measuring 2 mm per side and having a thickness of 0.7 mmm. RFID tag 2 is arranged near the end portion of slit window 113 (FIG. 3) in a state of being not in electrical contact with electroconductive layer 112.

Tag sheet 20 is a sheet-shaped member cut out from a PET (PolyEthylene Terephthalate) film. On the surface of tag sheet 20, an antenna pattern 231 is formed, which is a printed pattern of a electroconductive ink made of a sliver paste. Antenna pattern 231 exhibits an annular shape with a notch, and a chip arrangement area (omitted in the drawing) for arranging IC chip 27 is formed in the notched portion. When IC chip 27 is bonded to this chip arrangement area, antenna pattern 231 is electrically connected to IC chip 27. IC chip 27 forms a processing circuit transmitting and receiving information via wireless communication. Antenna 23 formed by antenna pattern 231 transmits and receives information-superposed radio waves in a state of being electrically connected to IC chip 27.

Antenna 23 formed of antenna pattern 231 has a role as an antenna for power feeding in which an exciting current occurs by external electromagnetic induction and a role as an antenna for communication to wirelessly transmit information. Note that as the electroconductive ink for printing antenna pattern 231, a graphite paste, a silver chloride paste, a copper paste, a nickel paste, or the like can be used, in addition to the silver paste. Furthermore, antenna pattern 231 can be formed by copper etching or the like. Note that the above-described electroconductive layer 112 as a booster antenna functions as a secondary antenna for amplifying radio waves transmitted and received by this antenna 23 in a state of being not in electrical contact with antenna 23 as one example of a primary antenna.

IC chip 27 (FIG. 5) is an electronic component having a semiconductor elements, such as a ROM (Read Only Memory) and a RAM (Random Access Memory) as memory means and so forth, mounted on the surface of a sheet-shaped base material. IC chip 27 includes a processing circuit which processes information to be provided to the vehicle side. RFID tag 2 is manufactured by, as described above, affixing this IC chip 27 to the surface of the above-described tag sheet 20. To affix IC chip 27 of an interposer type provided with an electrode not depicted, any of various bonding methods can be adopted, such as ultrasonic bonding and caulking jointing, in addition to using a electroconductive adhesive.

Note that as a base material of tag sheet 20 and IC chip 27, a resin film made of polyethylene (PE), polyethylene terephthalate (PET), or polypropylene (PP), paper, or the like can be adopted. Furthermore, as the above-described IC chip 27, a semiconductor element itself may be used, or a chip made by packaging a semiconductor element with plastic resin or the like may be used. Also, the RFID tag is not limited to the one having the configuration of the present embodiment. Any of various RFID tags with different antenna shapes, different IC chip modes, different IC chip arrangements, and so forth can be adopted.

Figure 6:
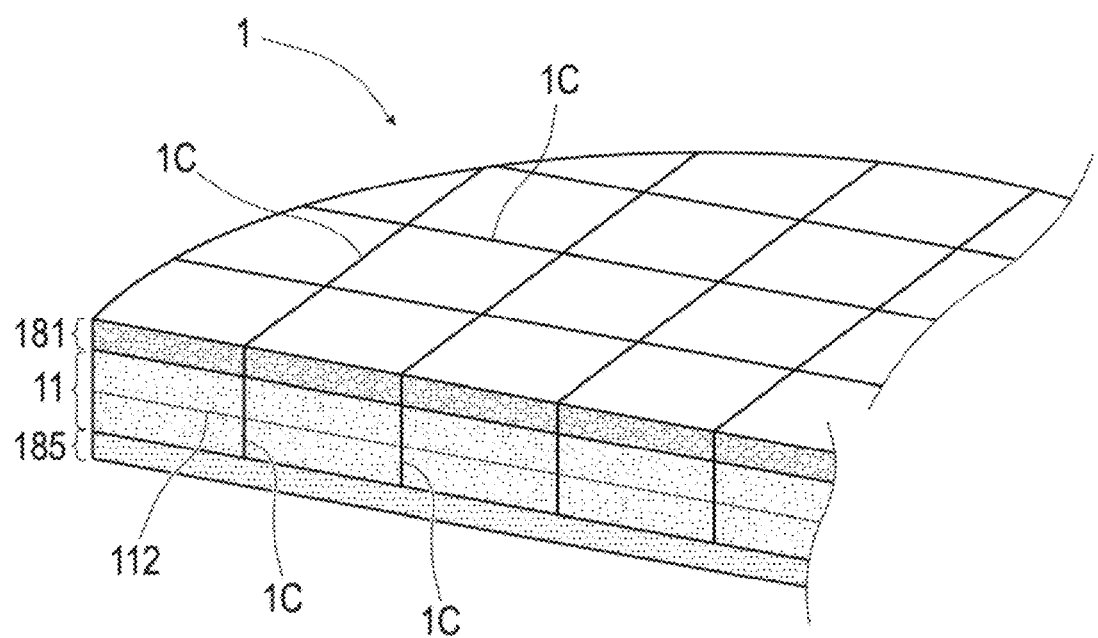
FIG. 6 is a descriptive diagram depicting cut lines provided in the magnetic marker.
Figure 7:
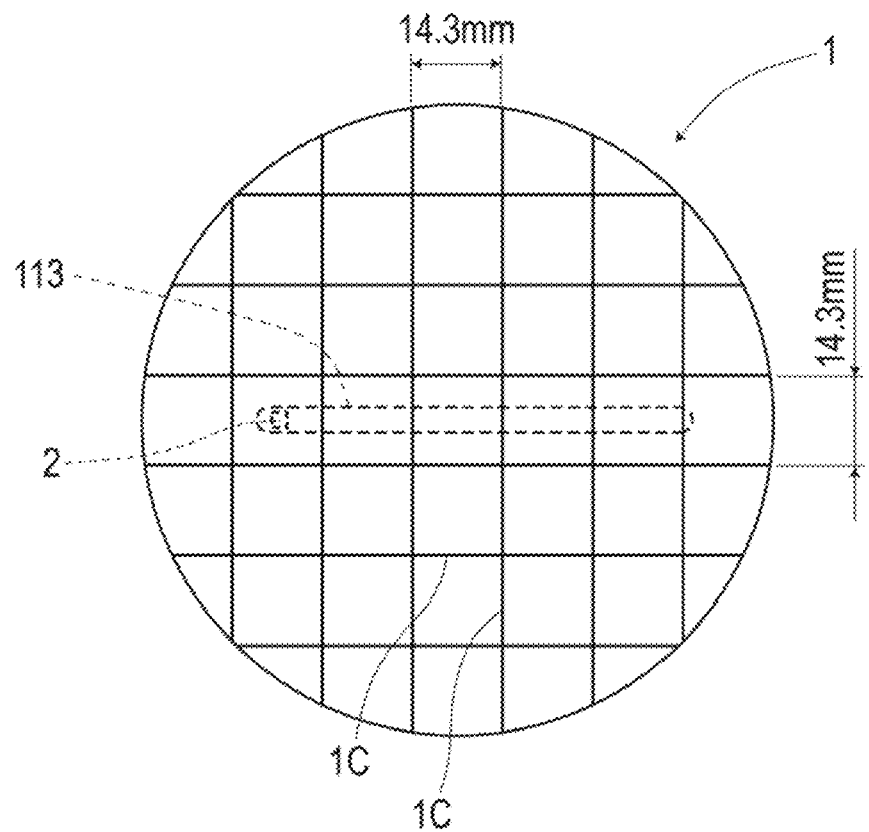
FIG. 7 is a front view of the magnetic marker provided with the cut lines.

Magnetic marker 1 of the present embodiment is divided into a plurality of regions by lattice-shaped cut lines 1C as in FIG. 1, FIG. 6, and FIG. 7. Cut lines 1C are provided so as to cut nonskid layer 181 and magnet sheet 11, while adhesive layer 185 being left. Of cut lines 1C in a lattice shape, a space between cut lines 1C parallel to each other is 14.3 mm. Cut lines 1C are provided so as to avoid RFID tag 2 accommodated inside magnet sheet 11 (between sheets 11A and 11B). That is, RFID tag 2 is arranged inside any region in a matrix shape obtained by division by the lattice-shaped cut lines 1C.

Figure 8:
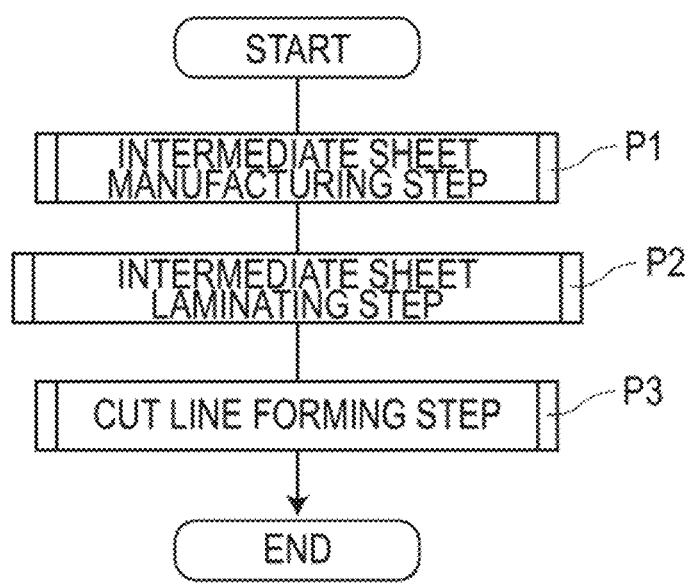
FIG. 8 is a flow diagram depicting a magnetic marker manufacturing procedure.

The above-configured magnetic marker 1 can be manufactured with a procedure of FIG. 8 including steps P1 to P3. Step P1 is a step of manufacturing sheets 11A and 11B (intermediate sheets) by forming an isotropic ferrite rubber magnet in a sheet shape. Step P2 is a step of laminating sheets 11A and 11B together so as to interpose RFID tag 2. Step P3 is a process of forming cut lines 1C. Electroconductive layer 112 provided with slit window 113 is formed over a nearly entire surface of sheet 11A, and RFID tag 2 is affixed to a surface of sheet 11A corresponding to the inside of slit window 113. Therefore, by performing step P2, it is possible to form, between the layers of sheets 11A and 11B, electroconductive layer 112 which amplifies radio waves transmitted and received by RFID tag 2.

Figure 9:
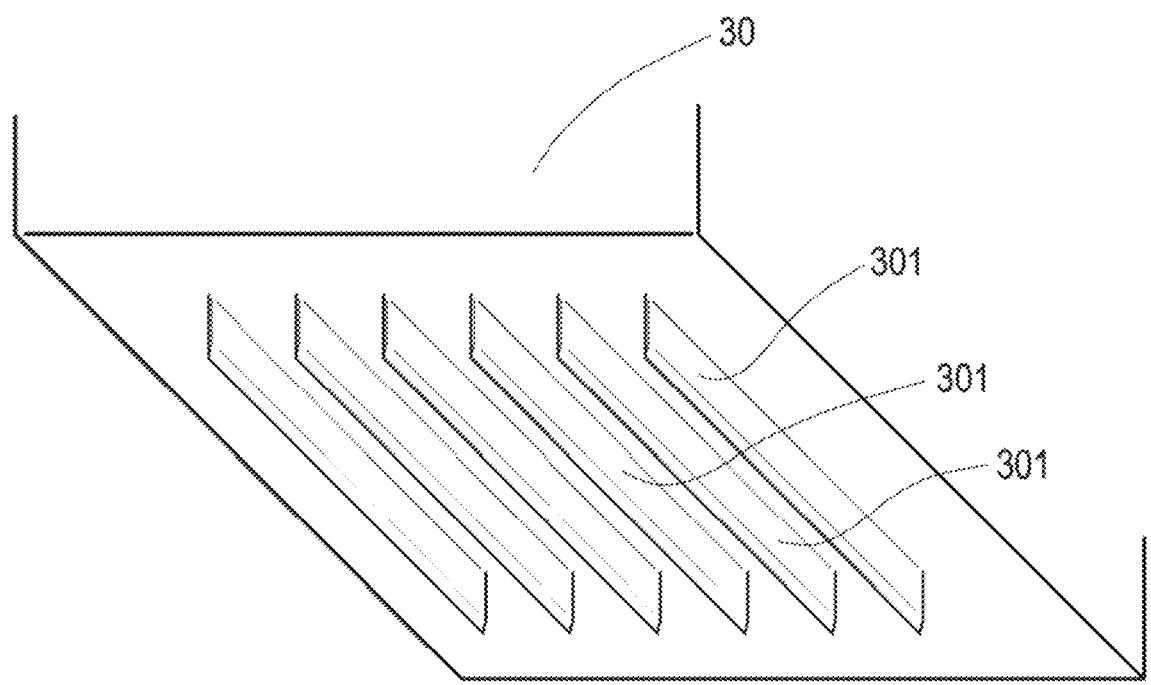
FIG. 9 is a perspective view of a Thomson die.
Figure 10:
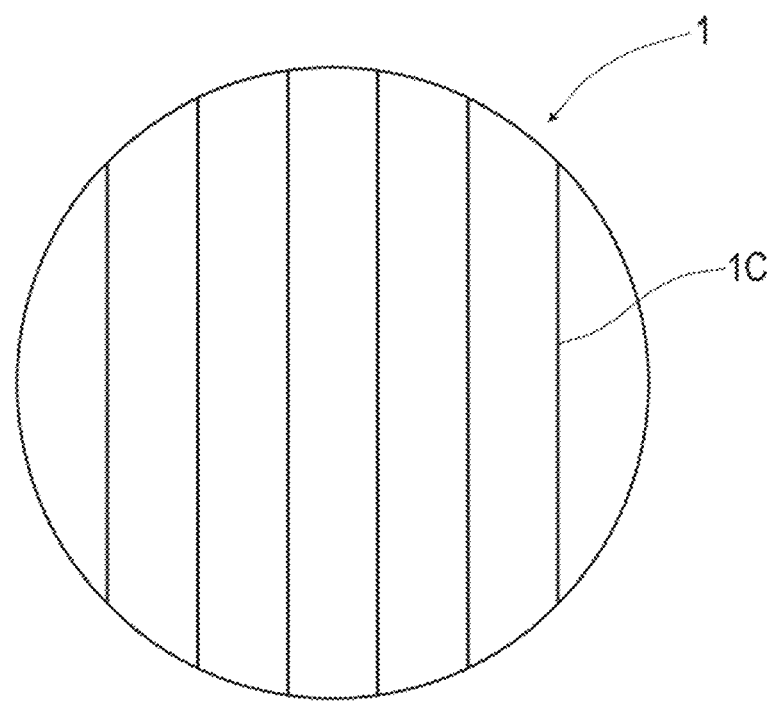
FIG. 10 is a descriptive diagram of a first cut step.
Figure 11:
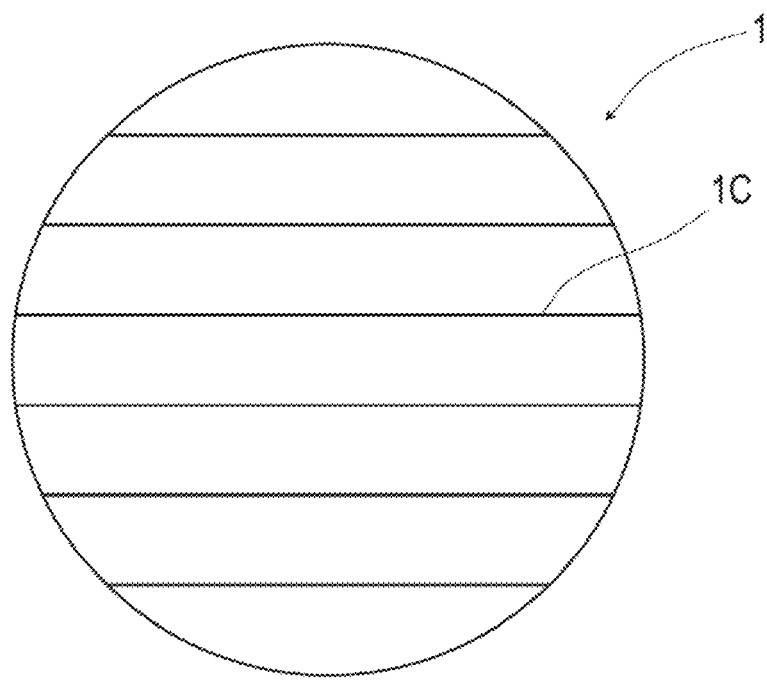
FIG. 11 is a descriptive diagram of a second cut step.

At step P3, for example, cut lines 1C can be formed by using Thomson die 30 of FIG. 9. Thomson die 30 of the drawing is a die having a plurality of linear-shaped Thomson blades 31 provided in parallel with pitches of 14.3 mm. When a first cut step of bringing Thomson die 30 near a placing surface (omitted in the drawing) placing magnetic marker 1 so as to make a gap of 1 mm is Performed, as in FIG. 10, magnetic marker 1 can be cut, with adhesive layer 185 having a thickness of 1 mm being left. With this, magnetic marker 1 can be divided into strip-shaped regions. Then, when a second cut step of rotating the Thomson die 30 by 90 degrees relatively to magnetic marker 1 is performed, as in FIG. 11, cut lines 1C orthogonal to cut lines 1C provided in the above-described first cut step can be formed. The lattice-shaped cut lines 1C (refer to FIG. 7) of magnetic marker 1 can be formed by, for example, two cut steps as described above.

Next, advantages of magnetic marker 1 provided with cut lines 1C are described.

The magnetic marker laid on the road may be weathered or may be stepped on by a tire. If the magnetic marker 1 is used over a long period of time, the bonding force with respect to the road surface decreases, and there is a possibility that a gap occurs between the magnetic marker and the road surface to cause peeling of the magnetic marker off from the road surface. If peeling occurs at one location of the bonding surface, there is a high possibility of expansion of that peeled region thereafter. The peeled region may expand in an accelerated manner, resulting in peeling of the entire magnetic marker.

On the other hand, magnetic marker 1 of the present embodiment is divided into a plurality of regions in a matrix by lattice-shaped cut lines 1C. For example, if peeling occurs at part of the bonding surface, a region that part belongs to can be isolated along cut lines 1C. Therefore, the possibility of expansion of peeling of magnetic marker 1 is small, and the possibility that partial peeling leads to whole peeling is small. Also, even if one region obtained by division into a matrix is isolated, the remaining other regions can maintain the magnetic characteristics of magnetic marker 1 to some extent, and the possibility that magnetic marker 1 on the vehicle side becomes unusable is small. As described above, magnetic marker 1 of the present embodiment acts with 40 µT (microteslas) or more on a position at a height of 250 mm with reference to the road surface. Even if isolation occurs from an outer circumferential side in accordance with peeling to decrease the size of the magnetic marker, the magnetic marker can be detected on a vehicle side if the state is such that magnetism of 10 µT or more acts on the position at a height of 250 mmm.

The region obtained by division by cut lines 1C is a thin, small piece having a thickness on the order of 3 mm and having a square shape measuring 14.3 mm per side. This thin, small, square-piece, peeled substance has a high possibility of, unlike a massive debris, losing momentum immediately as rotating by air resistance and not flying far away. Therefore, the possibility that the peeled substance from magnetic marker 1 hits a vehicle or person is extremely small. If this peeled substance hits something, the degree of influence is subtler than the influence due to an unavoidable stepping stone or the like on the road. For example, nonskid layer 181 with aggregate of various sizes mixed therein may be adopted. In this case, the surface of nonskid layer 181 can be made uneven, and this can increase air resistance when the peeled substance rotates. If the peeled substance is difficult to rotate, a distance of flying of the peeled substance when isolated from magnetic marker 1 can be decreased. A nonskid layer with a varied layer thickness may be adopted. In this case, with undulations of the surface of the nonskid layer, air resistance when the peeled substance rotates can be increased, and the barycenter of the peeled substance can be decentered. This can make the peeled substance difficult to rotate. The peeled substance that is difficult to rotate has a small possibility of flying far away.

Also, for example, the shape of the peeled substance may be such that the moment of inertia is larger than that of a square shape. With the shape with a large moment of inertia, the peeled substance isolated from the magnetic marker becomes difficult to rotate, and can be made difficult to fly far away. As a shape with a large moment of inertia than that of the square shape, a rectangular shape, a parallelogram shape, a trapezoidal shape, or the like can be thought. The cut lines may be provided so that the shape of the peeled substance is not a symmetrical shape but an asymmetrical shape. In this case, the peeled substance can be made difficult to rotate. For example, the square shape is vertically symmetrical and also laterally symmetrical. As for a trapezoidal shape that is laterally symmetrical but vertically asymmetrical, the moment of inertia becomes larger than that of the square shape. Furthermore, as for a trapezoidal shape that is laterally and vertically asymmetrical, the moment of inertial becomes still larger.

Note that the inventors have performed demonstration experiments and magnetic-field analysis simulations of the influence of cut lines 1C on the magnetic characteristics. As a result, the result has been obtained that the influence of cut lines 1C dividing magnet sheet 11 on the magnetic characteristics is extremely slight and at a negligible level. Also, similarly, the inventors have confirmed through the demonstration experiments that the influence of cut lines 1C on the antenna function of electroconductive layer 112 is also slight and at a negligible level.

In the present embodiment, continuous cut lines 1C for cutting magnet sheet 11 and nonskid layer 181 with adhesive layer 185 being left are exemplarily depicted. The cut lines may be those cutting magnet sheet 11 and adhesive layer 185 with nonskid layer 181 being left. The cut lines may be those cutting only magnet sheet 11. Also, for example, after cut lines are formed in magnet sheet 11 to divide it into a plurality of regions, nonskid layer 181 and adhesive layer 185 may be formed on both surfaces . Note that, cut lines may be adopted which cuts a half (0.5 mm) of adhesive layer 185 having a thickness of 1 mm remaining half (0.5 mm) of adhesive layer 185 being left, in addition to magnet sheet 11 and nonskid layer 181.

Figure 12:
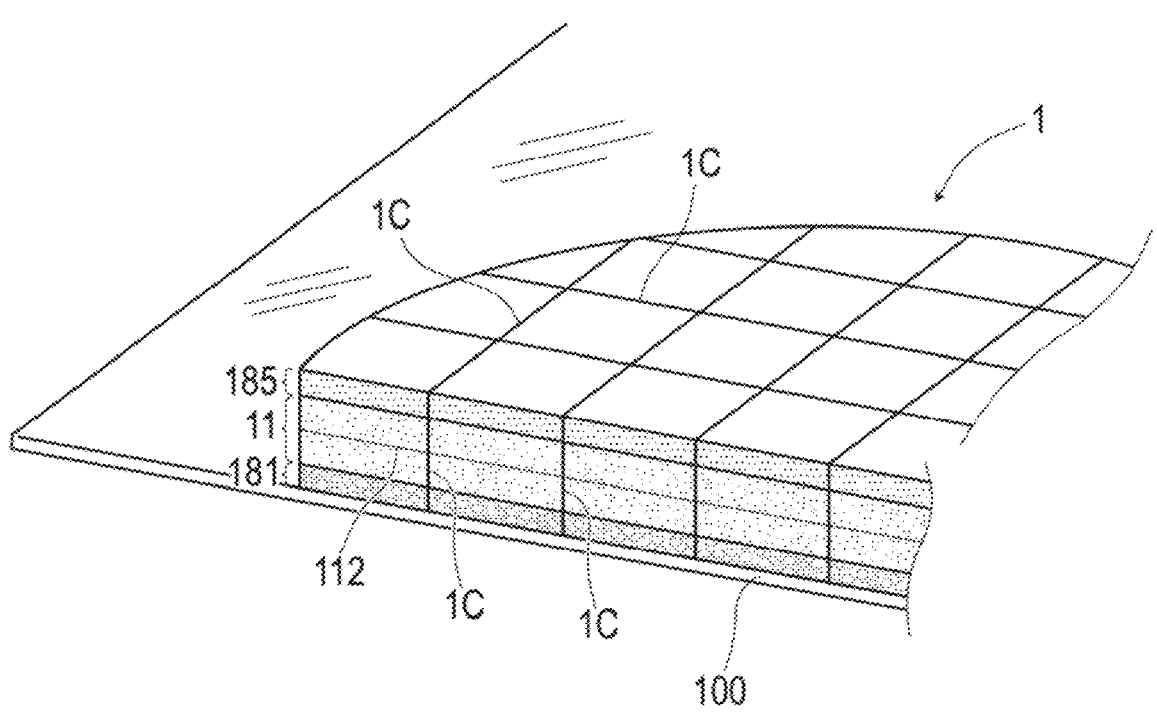
FIG. 12 is a descriptive diagram depicting the magnetic marker retained by a sheet-shaped liner.

Note that sheet-shaped liner 100 which retains magnetic marker 1 may be adopted (FIG. 12). In this case, even if cut lines 1C penetrating in a thickness direction are provided, magnetic marker 1 is not isolated. By pressing magnetic marker 1 in a state in which one surface is retained by liner 100 onto the road surface for bonding or the like and then peeling off liner 100, magnetic marker 1 can be transferred to the road surface. In this case, magnetic marker 1 is not isolated but integral if it is in a state of being transferred and bonded to the road surface. Liner 100 may retain the surface of magnetic marker 1 on a nonskid layer 181 side. In this case, magnetic marker 1 together with liner 100 can be pressed onto the road surface. Note that liner 100 may be of an individual-piece type which retains each individual magnetic marker 1, or may be of a continuous tape type which retains a plurality of magnetic markers 1. The magnetic marker may be retained so as to be interposed between two sheet-shaped liners. In this case, after the liner on an adhesive layer 185 side is peeled off, the magnetic marker may be pressed onto the road surface.

Figure 13:
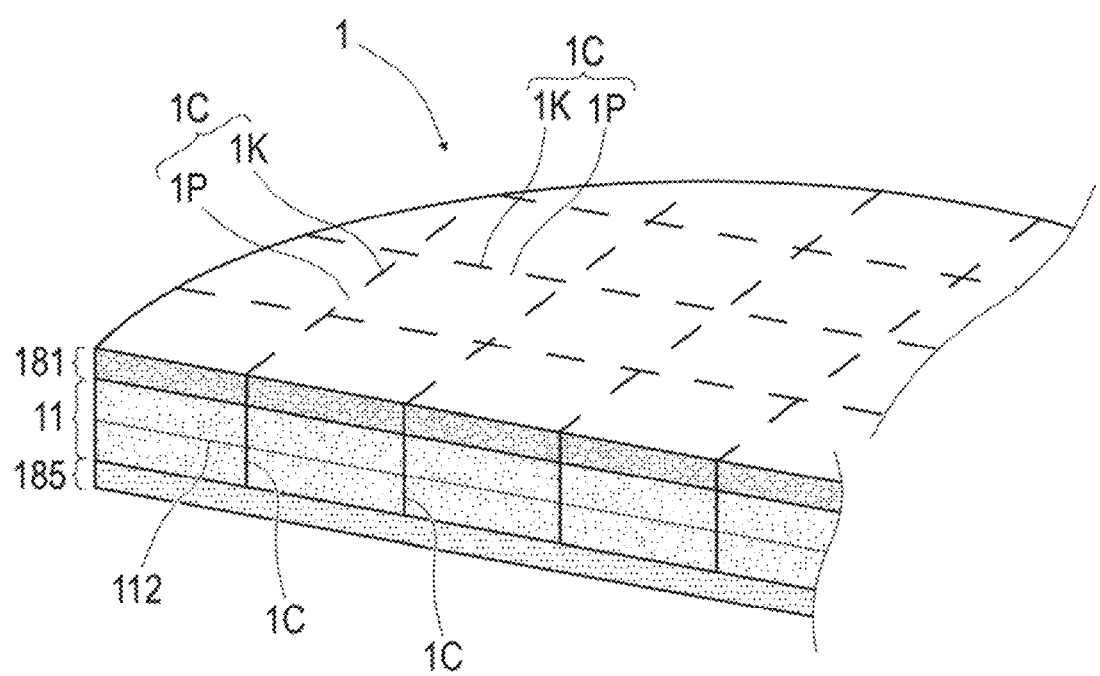
FIG. 13 is a descriptive diagram of perforated cut lines.

In place of the continuous cut lines 1C exemplarily depicted, intermittent cut lines such as perforations in which repetition of cut portions 1K and uncut portions 1P continues may be provided (FIG. 13). Cut portion 1K of the perforations may penetrate in the thickness direction, may cut only nonskid layer 181 and magnet sheet 11, may cut only adhesive layer 185 and magnet sheet 11, or may cut only magnet sheet 11. The length of each cut portion 1K may be, for example, 2 mm to 5 mm, and the length of each uncut portion 1P may be, for example, 1 mm to 2 mm.

Figure 14:
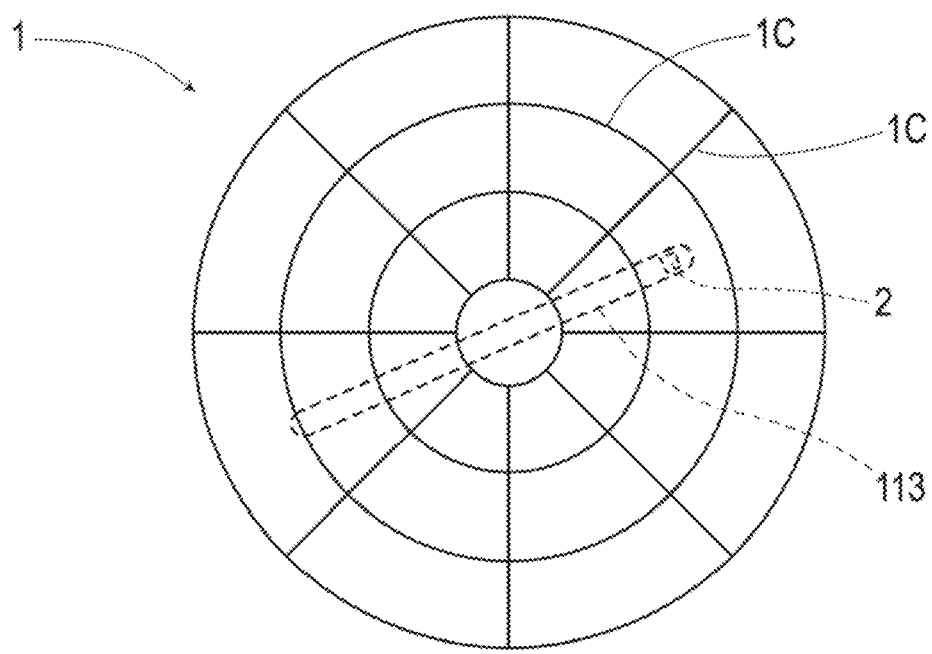
FIG. 14 is a front view of another first magnetic marker.
Figure 15:
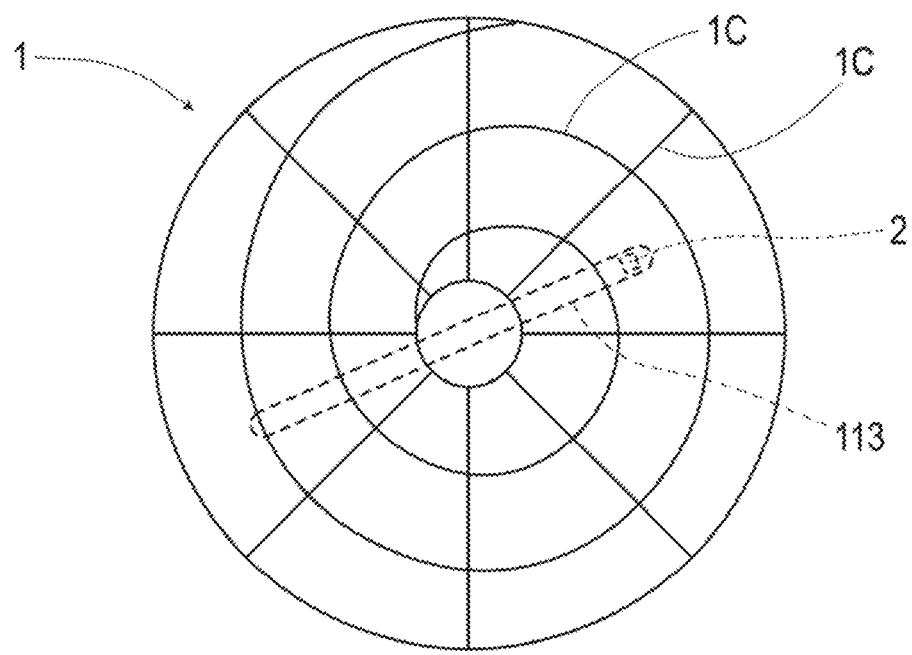
FIG. 15 is a front view of another second magnetic marker.

Also, in place of cut lines 10 provided in a lattice shape, a plurality of concentrically-circular cut lines having different diameters and cut lines which divide, in a circumferential direction, annular regions obtained by division by the plurality of concentrically-circular cut lines (for example, radial cut lines in a radial direction) may be combined (FIG. 14) . Alternatively, as in FIG. 15, with respect to swirl-shaped cut lines, radial cut lines in a radial direction may be combined. Only a plurality of concentrically-circular cut lines or swirl-shaped cut lines may be adopted. In the case of the plurality of concentrically-circular cut lines or swirl-shaped cut lines, the possibility of peeling from an outer circumferential side is high. When peeling of magnetic marker 1 occurs, isolation from the outer circumferential side of magnetic marker 1 can be made, and its circular shape can be maintained. If the shape of magnetic marker 1, the original shape of which is a circular shape, can be maintained in the circular shape, the shape characteristics of a magnetic distribution with which the magnetic marker 1 acts on surrounding can be maintained. If the shape characteristics of the magnetic distribution can be maintained, a relation between the shape of the magnetic distribution and the position of the magnetic marker becomes nearly constant. For example, there is an operation of identifying the position of the magnetic marker based on a distribution of magnetic measurement values by the magnetic sensor. If a change in the shape of the magnetic distribution with which the magnetic marker acts on the surrounding is small even if peeling of the magnetic marker occurs, the possibility of a significant decrease in accuracy of identifying the position of the magnetic sensor is small.

In the present embodiment, by laminating two sheets 11A and 11B, magnetic marker 1 having RFID tag 2 accommodated inside magnet sheet 11 is manufactured. In magnetic marker 1 having RFID tag 2 accommodated inside magnet sheet 11, durability of RFID tag 2 can be improved, compared with the configuration in which RFID tag 2 is affixed to the surface of magnet sheet 11 or RFID tag 2 is affixed to the surface of magnetic marker 1 itself. This is because sheets 11A and 11B configuring magnet sheet 11 can function as a protective sheet for RFID tag 2.

In the present embodiment, front surface side sheet 11B is laminated onto sheet 11A on the grounding side having RFID tag 2 affixed thereto and electroconductive layer 112 formed on the surface. In place of this, the electroconductive layer may be provided to one of sheets 11A and 11B and RFID tag 2 may be affixed to the other. It is only required that the slit window and the RFID tag be aligned so that the RFID tag is positioned inside the slit window formed in the electroconductive layer when sheets 11A and 11B are laminated together. Furthermore, electroconductive layer 112 may be provided on the outer surface of magnet sheet 11 having RFID tag 2 accommodated inside. Note that when electroconductive layer 112 and RFID tag 2 are arranged on different layers, electroconductive layer 112 may be formed over the entire surface of magnet sheet 11.

Note that RFID tag 2 is arranged near the end portion of slit window 113 of electroconductive layer 112. The position of RFID tag 2 in slit window 113 can be adjusted as appropriate. Depending on a relation between a dimension of slit window 113 in a longitudinal direction and a wavelength of radio waves transmitted and received by RFID tag 2, the optimum position of RFID tag 2 in the slit window 113 varies. In consideration of the dimension of slit window 113 and the wavelength, the position of RFID tag 2 is preferably adjusted as appropriate, such as near the end portion of slit window 113 or near the center of slit window 113.

Figure 16:
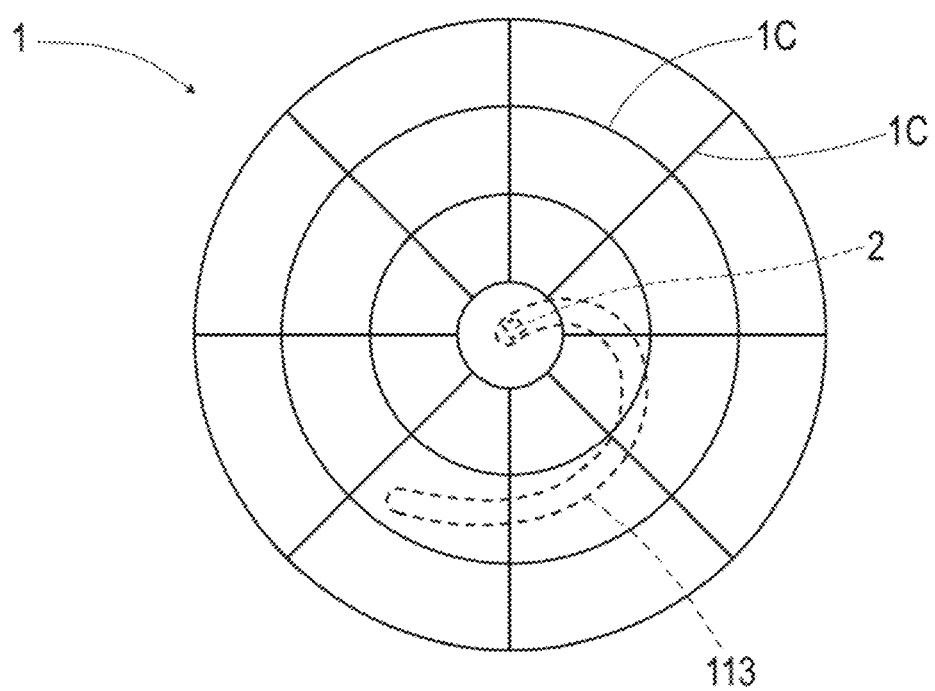
FIG. 16 is a descriptive diagram of another first slit window.

Note that in the case of magnetic marker 1 of the present embodiment provided with cut lines 1C so as to be isolatable from the outer circumferential side in accordance with peeling from the road surface, the position of RFID tag 2 is preferably near the center of magnetic marker 1. When RFID tag 2 is arranged near the end portion of the slit window, slit window 113 may be formed in an arc shape, a swirl shape, or a bent shape and RFID tag 2 may be arranged at its end portion (FIG. 16). In this case, RFID tag 2 can be positioned near the center of magnetic marker 1 while satisfying positional requirements of RFID tag 2 in the slit window. In this case, even if the outer circumferential side of magnetic marker 1 is isolated, the possibility of influencing RFID tag 2 can be reduced, and RFID tag 2 can transmit radio waves with high reliability. RFID tag 2 may be arranged near the center in the longitudinal direction of the slit window provided to extend in a radial direction of circular-shaped magnetic marker 1.

Figure 17:
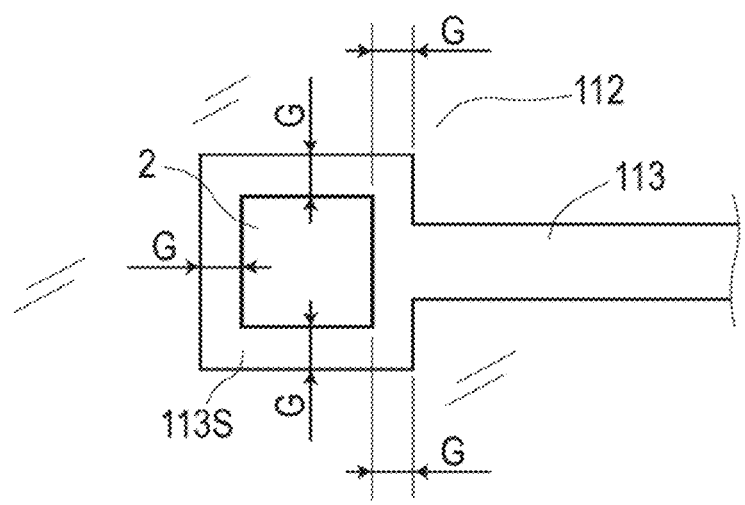
FIG. 17 is a descriptive diagram of another second slit window.

Slit window 113 exemplarily depicted in FIG. 17 may be adopted in place of slit window 113 exemplarily depicted in FIG. 3, FIG. 4, and so forth. A main body portion of slit window 113 exemplarily depicted in the drawing has a width narrower than that of RFID tag 2. Also, tag space 113S for arranging RFID tag 2 is provided at an end portion of slit window 113. This tag space 113S is a square-shaped space next larger than square-shaped RFID tag 2. By arranging RFID tag 2 in tag space 113S, substantially constant gap G can be formed between the outer periphery of square-shaped RFID tag 2 and electroconductive layer 112. With the dimension of gap G between RFID tag 2 and electroconductive layer 112 appropriately set, the degree of electromagnetic coupling between antenna 23 inside RFID tag 2 and the secondary antenna formed by electroconductive layer 112 can be enhanced, and the sensitivity of transmission and reception of radio waves by RFID tag 2 can be improved. Note that as the dimension of gap G, for example, a dimension on the order of 0.25 mm to 0.5 mm or on the order of 0.1 mm to 1 mm can be set. In particular, square-shaped tag space 113S as in FIG. 17, substantially constant gap G can be arranged, facing all four sides of quadrilateral-shaped (square-shaped) RFID tag 2. With this arrangement of gap G, the degree of electromagnetic coupling between antenna 23 inside RFID tag 2 and the secondary antenna formed by electroconductive layer 112 can further be enhanced, and the sensitivity of transmission and reception of radio waves by RFID tag 2 can further be improved.

Also, slit window 113 may be formed by forming an elongated recess having a width of 2.5 mm and a length of 70 mm along a radial direction on the surface of the circular-shaped intermediate sheet made of an isotropic ferrite rubber magnet and then forming electroconductive layer 112 on the surface except the recess. Alternatively, processing of denting the inside of slit window 113 may be performed on sheet 11A having electroconductive layer 112 with slit window 113 formed thereon. Examples of denting processing are pressworking, counterboring, and so forth.

The recess inside slit window 113 is useful for allocating an accommodation space of RFID tag 2 between sheets 11A and 11B.

Also, in place of lamination of two sheets 11A and 11B, a magnet sheet for accommodating RFID tag 2 inside may be manufactured by insert-molding RFID tag 2. Here, together with RFID tag 2, an electroconductive foil such as a copper foil may also be insert molded. Alternatively, an electroconductive layer may be formed on the surface of a magnet sheet produced by insert-molding RFID tag 2.

In the present embodiment, integrated RFID tag 2 having IC chip 27 and antenna 23 disposed on the surface of tag sheet 20 is exemplarily described, and a configuration example is described in which entire RFID tag 2 is accommodated inside magnet sheet 11. In the case of RFID tag having an external antenna (primary antenna) electrically connected to an IC chip forming a processing circuit, the IC chip may be accommodated inside magnet sheet 11 and the antenna may be provided on the surface of magnet sheet 11 or the like. Alternatively, the antenna may be accommodated inside magnet sheet 11 and the IC chip may be arranged on the surface of magnet sheet or the like. In this manner, RFID tag may be accommodated not entirely but partially inside magnet sheet 11. When part of the RFID tag is accommodated inside magnet sheet 11, that part of RFID tag can be protected by sheets 11A and 11B configuring magnet sheet 11. In this case, durability of the RFID tag can be improved, compared with a case in which the entire RFID tag is affixed to the surface of the magnet sheet.

Sheets 11A and 11B of the present embodiment have an electrical characteristic of low electrical conductivity. This electrical characteristic of sheets 11A and 11B very effectively acts for the operation of RFID tag 2. For example, when power required for operation of RFID tag 2 is wirelessly transferred by electromagnetic induction or the like, if an eddy current occurs inside sheets 11A and 11B, efficiency of power transmission is significantly impaired. Since sheets 11A and 11B molded of magnetic powder have high electrical internal resistance, the eddy current can be reduced, and power can be efficiently transferred. Similarly, since the degree of attenuation of radio waves transmitted from RFID tag 2 inside sheets 11A and 115 is low, transmission radio waves from RFID tag 2 can be received with high reliability on the vehicle side.

Magnetic marker of the present embodiment is a magnetic marker provided with adhesive layer 185 on the back surface side of magnet sheet 11 and nonskid layer 181 on the front surface side. In place of adhesive layer 185 or nonskid layer 181, a resin layer made of a resin material may be provided. This maybe a layer made of a composite material having glass fiber or the like impregnated with a resin material. A resin layer may be formed on an outer circumferential side surface of the magnetic marker. In place of nonskid layer 185, a weather-resistant sheet with a less degree of alteration such as deformation, discoloration, and degradation under outdoor environments may be adopted. As a weather-resistant sheet, for example, a sheet made of a resin material mixed with an ultraviolet absorbent may be adopted.

Note that while magnetic marker 1 including RFID tag 2 is exemplarily depicted in the present embodiment, RFID tag 2 is not an essential component. Also for magnetic marker 1 not including RFID tag 2, the technical idea of dividing into a plurality of regions by a cut line is effective.

In the foregoing, specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 magnetic marker
1C cut line
11 magnet sheet
11A, 11B sheet (intermediate sheet)
112 conductive layer (secondary antenna)
113 slit window
181 nonskid layer
185 adhesive layer
2 RFID tag (wireless tag)
20 tag sheet
23 antenna (primary antenna)
27 IC chip (processing circuit)

The invention claimed is:

1. A sheet-shaped magnetic marker to be laid on a road surface so as to be able to be detected by a magnetic sensor attached to a vehicle to achieve assist for driving operation of the vehicle by a driver or control on a vehicle side to achieve automatic driving independently from operation of the driver, wherein
the magnetic marker is divided into at least two regions by or an intermittent cut line, and
the magnetic marker is configured so that, when each region of said at least two regions is peeled off from the road surface, isolation can be made by the cut line from an adjacent region.

2. The magnetic marker in claim 1, wherein said cut lines are provided so as to form a lattice shape.

3. The magnetic marker in claim 2, wherein the magnetic marker includes at least a layer of a magnet sheet, which is a sheet-shaped magnet, and has laminated thereon a layer of an adhesive material to be affixed to the road surface, and
the cut line is formed to penetrate through all layers except the layer of the adhesive material, and the magnet sheet is cut by the cut line.

4. The magnetic marker in claim 1, wherein the magnetic marker includes at least a layer of a magnet sheet, which is a sheet-shaped magnet, and has laminated thereon a layer of an adhesive material to be affixed to the road surface, and
the cut line is formed to penetrate through all layers except the layer of the adhesive material, and the magnet sheet is cut by the cut line.

5. The magnetic marker in claim 1, wherein the cut line is an intermittent cut line, as perforations, with a continuous repetition of a cut portion penetrating through the magnetic marker in a thickness direction and an uncut portion.

6. The magnetic marker in claim 1, wherein the magnetic marker includes a nonskid layer having a non-slip function of reducing a possibility of slipping of a tire of the vehicle, and
the non-skid layer is a non-skid layer containing aggregates of various sizes or having a varied layer thickness.

7. The magnetic marker in claim 1, wherein a shape of the region isolated is the shape which has a moment of inertia larger than a moment of inertia of a square shape.

8. The magnetic marker in claim 7, wherein the shape of the region isolated is asymmetrical.

9. The magnetic marker in claim 1, wherein the magnetic marker includes at least a layer of a magnet sheet, which is a sheet-shaped magnet, and the magnet sheet is divided into at least two regions by the cut line.

10. The magnetic marker in claim 1, wherein the magnetic marker is divided into the at least two regions by the intermittent cut line by intermittently providing a range of penetrating in a thickness direction.

11. A sheet-shaped magnetic marker to be laid on a road surface so as to be able to be detected by a magnetic sensor attached to a vehicle to achieve assist for driving operation of the vehicle by a driver or control on a vehicle side to achieve automatic driving independently from operation of the driver, wherein
the magnetic marker is divided into at least two regions by a continuous or intermittent cut line,
the magnetic marker is configured so that, when each region of said at least two regions is peeled off from the road surface, isolation can be made by the cut circular line from an adjacent region,
said cut lines include a plurality of concentrically-cut lines having a same center and different diameters and a cut line which divides, in a circumferential direction, annular regions obtained by division by the plurality of concentrically-circular cut lines, and
the magnetic marker is configured so that, of said at least two regions configuring the magnetic marker, a region positioned on an outer circumferential side can be isolated by the cut line from an adjacent region on an inner circumferential side, and each region configuring the magnetic marker is peeled off from the outer circumferential side.

12. The magnetic marker in claim 11, wherein the magnetic marker includes at least a layer of a magnet sheet, which is a sheet-shaped magnet, and has laminated thereon a layer of an adhesive material to be affixed to the road surface, and
the cut line is formed to penetrate through all layers except the layer of the adhesive material, and the magnet sheet is cut by the cut line.

13. A sheet-shaped magnetic marker to be laid on a road surface so as to be able to be detected by a magnetic sensor attached to a vehicle to achieve assist for driving operation of the vehicle by a driver or control on a vehicle side to achieve automatic driving independently from operation of the driver, wherein
the magnetic marker is divided into at least two regions by a continuous or intermittent cut line,
the magnetic marker is configured so that, when each region of said at least two regions is peeled off from the road surface, isolation can be made by the cut line from an adjacent region,
the magnetic marker comprises a wireless tag which outputs information via wireless communication to the vehicle side, the wireless tag including a processing circuit for processing information and a primary antenna electrically connected to the processing circuit so as to be able to transmit and receive information-superposed radio waves, and
the cut line is formed as avoiding at least the processing circuit and the primary antenna.

14. The magnetic marker in claim 13, wherein the wireless tag includes a secondary antenna for amplifying the radio waves transmitted and received by the primary antenna in a state of being not in electrical contact with the primary antenna, and the secondary antenna is divided into at least two regions by the cut line.

15. The magnetic marker in claim 13, wherein the cut line is an intermittent cut line, as perforations, with a continuous repetition of a cut portion penetrating through the magnetic marker in a thickness direction and an uncut portion.

16. The magnetic marker in claim 13, wherein the magnetic marker before laid on the road surface is retained in a sheet-shaped liner for retaining the magnetic marker, and the magnetic marker can be transferred to the road surface by bonding the magnetic marker, with one side retained by the liner, to the road surface and then peeling off the liner, and the magnetic marker retained by the liner is divided into at least two regions by a continuous cut line penetrating in a thickness direction.

17. The magnetic marker in claim 13, wherein the magnetic marker includes a nonskid layer having a non-slip function of reducing a possibility of slipping of a tire of the vehicle, and the non-skid layer is a non-skid layer containing aggregates of various sizes or having a varied layer thickness.

18. The magnetic marker in claim 13, wherein a shape of the region isolated is the shape which has a moment of inertia larger than a moment of inertia of a square shape.

19. The magnetic marker in claim 13, wherein the magnetic marker includes at least a layer of a magnet sheet, which is a sheet-shaped magnet, and the magnet sheet is divided into at least two regions by the cut line.

20. A sheet-shaped magnetic marker to be laid on a road surface so as to be able to be detected by a magnetic sensor attached to a vehicle to achieve assist for driving operation of the vehicle by a driver or control on a vehicle side to achieve automatic driving independently from operation of the driver, wherein the magnetic marker is divided into at least two regions by a continuous or intermittent cut line, the magnetic marker is configured so that, when each region of said at least two regions is peeled off from the road surface, isolation can be made by the cut line from an adjacent region, the magnetic marker before laid on the road surface is retained in a sheet-shaped liner for retaining the magnetic marker, and the magnetic marker can be transferred to the road surface by bonding the magnetic marker, with one side retained by the liner, to the road surface and then peeling off the liner, and the magnetic marker retained by the liner is divided into at least two regions by a continuous cut line penetrating in a thickness direction.

21. A sheet-shaped magnetic marker to be laid on a road surface so as to be able to be detected by a magnetic sensor attached to a vehicle to achieve assist for driving operation of the vehicle by a driver or control on a vehicle side to achieve automatic driving independently from operation of the driver, wherein the magnetic marker is divided into at least two regions by a continuous or intermittent cut line, the magnetic marker is configured so that, when each region of said at least two regions is peeled off from the road surface, isolation can be made by the cut line from an adjacent region, a swirl-shaped cut line and a radial cut line in a radial direction are provided, and the magnetic marker is configured so that, of said at least two regions configuring the magnetic marker, a region positioned on an outer circumferential side can be isolated by the cut line from an adjacent region on an inner circumferential side, and each region configuring the magnetic marker is peeled off from the outer circumferential side.

\* \* \* \* \*